Patented Oct. 8, 1929

1,731,073

UNITED STATES PATENT OFFICE

FRANK E. LICHTENTHAELER, OF NEWTON HIGHLANDS, MASSACHUSETTS

METHOD OF COOLING WORTS DURING FERMENTATION

No Drawing.  Application filed March 14, 1925.  Serial No. 15,636.

The present invention relates to an improved method of cooling worts during fermentation.

In converting sugars into ethyl alcohol by fermentation, heat is evolved. The temperature at which the fermentation takes place most efficiently is approximately 85° F. to 100° F. In northern latitudes this temperature of fermentation is easily maintained by various methods which are entirely satisfactory. In warmer climates, however, where atmospheric temperature varies from 85° F. to 100° F., cooling by some means is necessary in order to maintain a favorable temperature for fermentation, but water for cooling purposes is not available, as ordinarily its temperature varies from 80° F. to 85° F. or higher. In hot climates, therefore, unless the excess heat of fermentation is removed, fermentation temperatures will rise above the optimum temperature of 85° F. to 100° F., with a consequent reduction of yield. To offset this disadvantage dilute worts are usually employed, so that the excess heat can be distributed in a greater bulk of material comprising a larger proportion of water (one volume of molasses to six volumes of water being one usual mixture). This procedure tends to reduce the unfavorable temperature rise, but it is open to the objection that the large volume of water introduced adds considerably to the cost of subsequent distillation to separate the alcohol. The evaporative cooling effect of spraying the tanks is also employed, and in the case of metal tanks it contributes to the desired result, but in insufficient degree to insure the maintenance of the desired 85° F. to 100° F., and the expensive pumping of very large volumes of water is involved.

The carbonic acid evolved during the fermentation of the worts has been collected and used for various purposes such as in refrigerating machines, or for carbonating beverages. This gas being available, and refrigeration of the wort being requisite, has suggested to the applicant the present invention, which consists, in its narrower aspects, in collecting the carbonic acid gas generated during fermentation, compressing and cooling it by adiabatic expansion and introducing it into the wort so that as it rises through the wort it contributes its refrigerating effect. Broadly considered, the invention consists in introducing into fermenting wort, which requires cooling to the temperature of efficient fermentation dried and cooled, carbonic acid gas, which in rising through the wort, refrigerates it.

In carrying out the present invention, the fermenting tank, in the case of molasses, water and yeast, is provided with a gas tight cover. The carbonic acid gas evolved during the fermentation is drawn off through a suitable conductor, purified by scrubbing to remove alcohol, and is then compressed into cylinders or other suitable reservoirs. By any convenient arrangeemnt of compression stages, intercoolers and after coolers, practically all of the alcohol and water vapor carried by the carbonic acid is condensed out, and the compressed or liquefied carbonic acid is thus thoroughly or well dried. This dried, compressed or liquefied carbonic acid in the required amount is expanded adiabatically and then introduced into the fermenting wort, where it will produce the desired cooling effect contributed by its previous adiabatic expansion. The refrigerating effect of adiabatic expansion is secured by first expanding the compressed and cooled gas through a gas turbine or reciprocating engine, the gas being thus cooled far below normal temperature.

Liquid carbonic acid may be used if convenient, and the refrigeration due to the change of state from liquid to vapor may be used for addition cooling. This expedient, however, is not considered to be necessary under ordinary circumstances, but under conditions in which liquid carbon dioxide is available, its use is within the contemplation of the invention.

One of the important advantages of the invention resides in the fact that thick worts may be used in hot climates, which otherwise would be impossible owing to the excessive temperature rise of fermentation which would exhibit itself in the absence of sufficient means for cooling. This is in accord with modern practice, which contemplates the use of thick wort fermentation to reduce the extent of subsequent distillation of the alcohol.

Higher yields of alcohol being obtained in the case of the use of thick worts is another advantage incident to the use of this method.

The method of cooling described is especially useful in the case of fermenting wort. Carbonic acid as the cooling agent does not affect the fermentation. On the other hand compressed air could not be used because it would cause the sugar to be used up for yeast growth instead of alcohol production. Furthermore the carbonic acid being a by-product of the fermentation, its recirculation involves little or no loss of this gas.

Broadly considered, the invention consists in the method of cooling worts during fermentation by introducing dried fermentation gas into the mash below the surface thereof, and more specifically the invention consists in introducing dried and cooled fermentation gases in the wort.

The foregoing description of the specific embodiment of the invention as applied to fermentation of mashes to produce ethyl alcohol is illustrative of the invention and specific to that embodiment.

The expression "carbonic acid gas" is intended to be inclusive of both the dry anhydride and the gas or liquid having some water content.

The process may be carried on at atmospheric pressure or above or below the same. When liquid carbon di-oxide is used it is, of course, introduced at the pressure at which the process is worked.

Having thus described the invention, what is claimed is:

1. The method of cooling worts during alcoholic fermentation which comprises introducing into the wort below the surface thereof, carbonic acid gas undersaturated with moisture and at a temperature below the optimum of such fermentation.

2. The method of cooling worts during alcoholic fermentation which comprises introducing into the wort below the surface thereof, carbonic acid gas below a temperature of 85° F.

3. The method of cooling worts during alcoholic fermentation which comprises introducing carbonic acid gas into the wort cooled below the optimum temperature of such fermentation.

4. The method of cooling worts during alcoholic fermentation which comprises introducing compressed carbonic acid gas into the wort cooled below the optimum temperature of such fermentation.

5. The method of cooling worts during alcoholic fermentation which comprises drawing off the carbonic acid gas evolved, compressing, cooling and reintroducing it into the wort at a temperature such as to maintain the mash at a temperature of 85° to 100° F.

6. The method of cooling worts during alcoholic fermentation which comprises drawing off the carbonic acid gas evolved, compressing it, cooling it, adiabatically expanding the carbonic acid gas to further cool it, and reintroducing it into the wort.

7. The method of cooling worts during alcoholic fermentation which comprises introducing carbonic acid gas into the wort in such quantities and at such temperatures, pressures and dryness as to absorb heat from the wort by expansion within the wort and to secure absorption of water and alcohol to maintain the desired temperature of fermentation.

8. The method of cooling worts during alcoholic fermentation which comprises introducing compressed and dried carbonic acid gas into the wort at a temperature lower than that of the wort.

9. The method of cooling worts during alcoholic fermentation which comprises drawing off the carbonic acid gas evolved during fermentation, compressing, cooling and reintroducing such cooled carbonic acid gas in the wort.

In testimony whereof I have signed my name to this specification.

FRANK E. LICHTENTHAELER.